US012601854B2

(12) United States Patent
Ghannam et al.

(10) Patent No.: US 12,601,854 B2
(45) Date of Patent: Apr. 14, 2026

---

(54) WEATHER DETECTION FOR A VEHICLE ENVIRONMENT

(71) Applicant: Ford Global Technologies, LLC, Dearborn, MI (US)

(72) Inventors: Mahmoud Yousef Ghannam, Canton, MI (US); Robert Schroeter, Livonia, MI (US); Jake Schwartz, Dearborn, MI (US); Anthony Dwayne Cooprider, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 18/501,519

(22) Filed: Nov. 3, 2023

(65) Prior Publication Data

US 2025/0147202 A1 May 8, 2025

(51) Int. Cl.
*G01W 1/02* (2006.01)
*G01W 1/00* (2006.01)

(52) U.S. Cl.
CPC ........ *G01W 1/02* (2013.01); *G01W 2001/006* (2013.01); *G01W 2203/00* (2013.01)

(58) Field of Classification Search
CPC .......................... G01W 1/02; G01W 2001/006
USPC .......................................................... 701/2
See application file for complete search history.

(56) References Cited

U.S. PATENT DOCUMENTS

| | | | |
|---|---|---|---|
| 9,451,030 B2 | 9/2016 | Schunder et al. | |
| 11,647,164 B2 | 5/2023 | Mobbs | |

| | | | | |
|---|---|---|---|---|
| 2017/0108350 A1* | 4/2017 | Nagao | ...................... | G01D 3/08 |
| 2017/0251339 A1* | 8/2017 | Addepalli | ........... | H04L 43/0811 |
| 2020/0192403 A1* | 6/2020 | Silver | ................... | B60W 10/18 |
| 2022/0126864 A1* | 4/2022 | Moustafa | .............. | B60W 50/14 |

FOREIGN PATENT DOCUMENTS

| | | |
|---|---|---|
| CN | 107257756 B | 11/2020 |

OTHER PUBLICATIONS

Mikko Heiskala, Jani-Pekka Jokinen, Markku Tinnilä, Crowdsensing-based transportation services—An analysis from business model and sustainability viewpoints, Research in Transportation Business & Management, vol. 18 2016, pp. 38-48, (Year: 2016).*
Aerospace, Airborne Background Oriented Schlieren Technique (TOP 2-271), Ref. No. TOP2,271, Case No. ARC-17673-2, U.S. Pat. No. 10,169,847.
Lavision Focus on Imaging, BOS Imaging.

* cited by examiner

*Primary Examiner* — Erin M Piateski
*Assistant Examiner* — Brian K Palmarchuk
(74) *Attorney, Agent, or Firm* — Frank Lollo; Price Heneveld LLP

(57) ABSTRACT

A weather detection system for a vehicle includes a weather sensor configured to sense an environmental condition of a region external to the vehicle in an operable state, an actuator for controlling a response to the environmental condition, a network interface configured to access weather data from a vehicle fleet, and control circuitry in communication with the weather sensor and the actuator. The control circuitry is configured to access the weather data via the network interface, compare the weather data to the environmental condition, detect an inoperable state of the weather sensor based on the comparison, and control the actuator based on detection of the inoperable state.

20 Claims, 4 Drawing Sheets

WEATHER DETECTION FOR A VEHICLE ENVIRONMENT

FIELD OF THE DISCLOSURE

The present disclosure generally relates to weather detection for a vehicle environment and, more particularly, to a crowdsourced weather detection system that monitors sensor operability and rewards users for sharing weather information.

BACKGROUND OF THE DISCLOSURE

Vehicle sensors typically monitor the temperature and rain conditions of the outside of a vehicle.

SUMMARY OF THE DISCLOSURE

According to a first aspect of the present disclosure, a weather detection system for a vehicle includes a weather sensor configured to sense an environmental condition of a region external to the vehicle in an operable state, an actuator for controlling a response to the environmental condition, a network interface configured to access weather data from a vehicle fleet, and control circuitry in communication with the weather sensor and the actuator. The control circuitry is configured to access the weather data via the network interface, compare the weather data to the environmental condition, detect an inoperable state of the weather sensor based on the comparison, and control the actuator based on detection of the inoperable state.

Embodiments of the first aspect of the present disclosure can include any one or a combination of the following features:

- the control circuitry is configured to report the environmental condition for communication to the vehicle fleet;
- a GPS that tracks a position of the vehicle and a server that processes the position of the vehicle and the environmental condition to anonymize information provided to the vehicle fleet;
- the control circuitry is configured to amalgamate data from individual nodes on the vehicle fleet and determine an estimation value for the environmental condition based on the amalgamation;
- the comparison includes detecting a difference between the estimation value and the environmental condition;
- the weather sensor includes a camera that captures images of the environment external and an image processor that processes the image to detect the environmental condition;
- the weather sensor includes a camera that captures images of the environment external and an image processor that processes the image to detect the environmental condition;
- the control circuitry includes a controller local to the vehicle configured to communicate an indication of the inoperable state and a software version of the image processor to the server in response to detection of the inoperable state;
- the server is configured to communicate an update for the image processor based on the software version;
- the control circuitry includes a controller local to the vehicle, wherein the controller is configured to perform the operations of reporting the environmental condition to the vehicle fleet selectively;

- the controller is selectively operable between an event-driven mode in which the controller communicates the environmental condition based on the nature of the environmental condition and an operation-driven mode in which the controller communicates the environmental condition during driving of the vehicle;
- a user interface in the vehicle, wherein the control circuitry is configured to communicate a signal to present an option at the user interface to select the event-driven mode or the operation-driven mode;
- the reporting of the environmental condition is controlled by the user via the user interface; and
- the control circuitry is configured to communicate a message to indicate an incentive to activate reporting of the environmental condition when the reporting is deactivated.

According to a second aspect of the present disclosure, a weather detection system for a vehicle includes a weather sensor configured to sense an environmental condition of a region external to the vehicle in an operable state, an actuator for controlling a response to the environmental condition, a network interface configured to access weather data from a vehicle fleet, and a controller local to the vehicle in communication with the weather sensor and the actuator. The controller is configured to control the actuator based on detection of an inoperable state of the weather sensor. The weather detection system further includes a server in communication with the controller that is configured to compare the weather data to the environmental condition and detect the inoperable state of the weather sensor based on the comparison.

Embodiments of the second aspect of the present disclosure can include any one or a combination of the following features:

- the controller is configured to selectively report the environmental condition to the server;
- the controller is selectively operable between an event-driven mode in which the controller communicates the environmental condition based on the nature of the environmental condition and an operation-driven mode in which the controller communicates the environmental condition during driving of the vehicle;
- a user interface in the vehicle, wherein the controller is configured to communicate a signal to present an option to select the event-driven mode or the operation-driven mode;
- the reporting of the environmental condition is controlled by the user via the user interface; and
- the controller is configured to communicate a message to indicate an incentive to activate reporting of the environmental condition when the reporting is deactivated.

According to a third aspect of the present disclosure, a weather detection system for a vehicle includes a weather sensor configured to sense an environmental condition of a region external to the vehicle in an operable state, an actuator for controlling a response to the environmental condition, a network interface configured to access weather data from a vehicle fleet, a GPS that tracks a position of the vehicle, a server that processes the position of the vehicle and the environmental condition to anonymize information from the vehicle provided to the vehicle fleet, and control circuitry in communication with the weather sensor and the actuator. The control circuitry is configured to report the environmental condition to the server, compare the weather data to the environmental condition, detect an inoperable state of the weather sensor based on the comparison, and control the actuator based on detection of the inoperable state.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
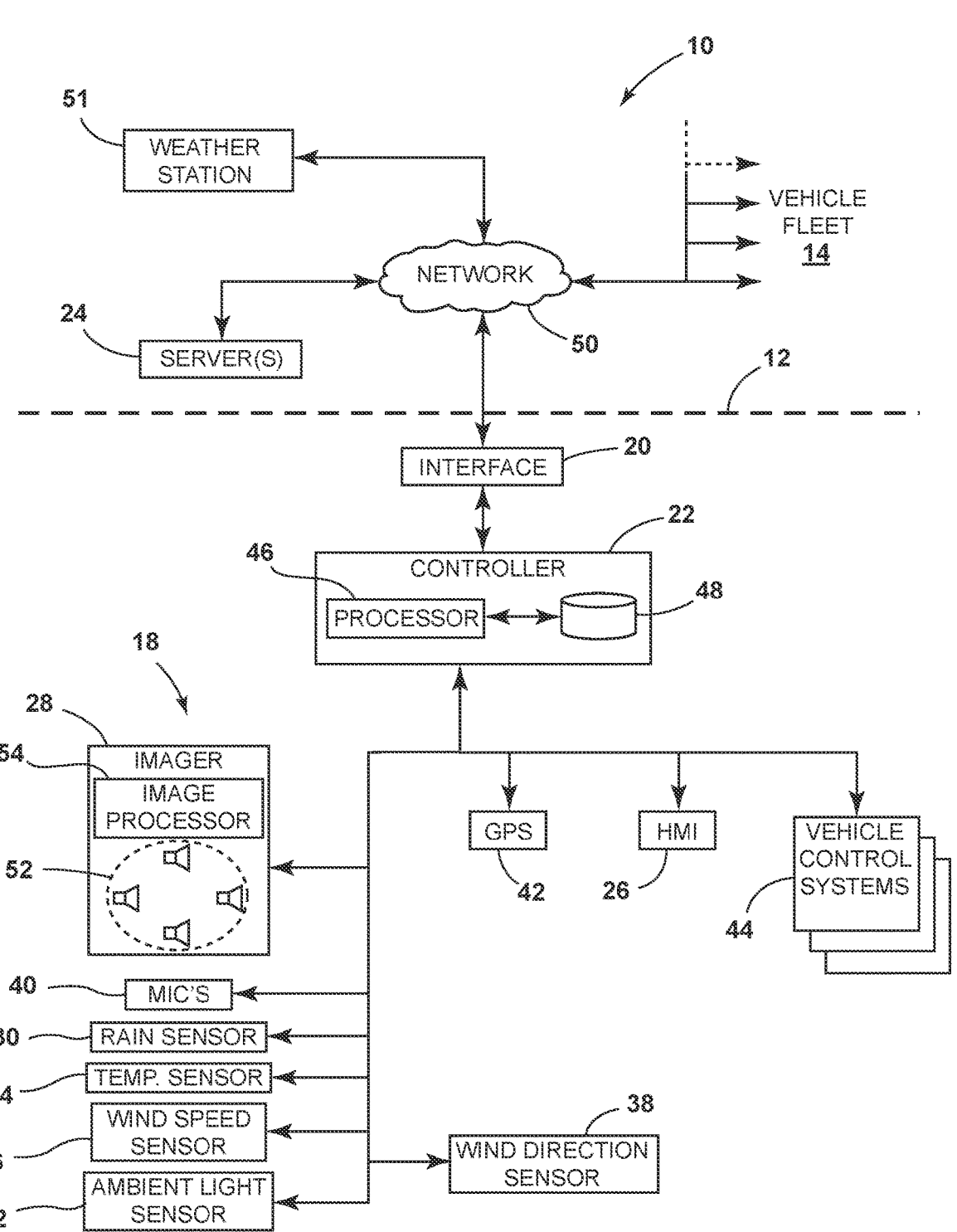
FIG. 1 is a block diagram of a weather detection system.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not too scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to weather detection for a vehicle environment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method S300, article, or apparatus that comprises a list of elements does not include only those elements but may include other elements not expressly listed or inherent to such process, method S300, article, or apparatus. An element preceded by "comprises . . . a" does not, without more constraints, preclude the existence of additional identical elements in the process, method S300, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-4, the present disclosure relates to a weather detection system 10 generally indicated at 10. The weather detection system 10 is configured for use with at least one vehicle 12, such as an automobile. For example, the vehicle 12 may be one of a vehicle fleet 14 that employs the weather detection system 10. Alternatively, the weather detection system 10 is local to the vehicle 12. In a preferred example, the weather detection system 10 is employed with the vehicle fleet 14 and categorizes the members of the vehicle fleet 14 as nodes 16a-16g for reporting environmental conditions using date one or more weather sensors 18 disposed on each one of the vehicle fleet 14. It is contemplated that the vehicle fleet 14 may include different vehicle models having different weather sensors 18 thereon. Thus, the vehicle fleet 14 may include a logical grouping of the nodes 16a-16g for the purposes of weather information reporting.

In general, the weather detection system 10 provides for enhanced data collection and inoperability detection for the weather sensors 18 using crowdsourcing. The weather detection system 10 further provides for an incentive-based model for weather-event reporting.

Referring now more particularly to FIG. 1, the weather detection system 10 for a vehicle 12 can include a weather sensor 18 configured to sense an environmental condition of a region external to the vehicle 12 in an operable state. The weather detection system 10 further includes an actuator for controlling a response to the environmental condition and a network interface 20 configured to access weather data from a vehicle fleet 14. Control circuitry is in communication with the weather sensor 18 and the actuator. The control circuitry is configured to access the weather data via the network interface 20, compare the weather data to the environmental condition, detect an inoperable state of the weather sensor 18 based on the comparison, and control the actuator based on detection of the inoperable state. In some examples, the control circuitry is configured to report the environmental condition for communication to the vehicle fleet 14. For example, the control circuitry may include a controller 22 local to the vehicle 12 and a server 24 remote from the vehicle. The controller 22 may be configured to perform the operations of reporting the environmental condition to the vehicle fleet 14 selectively.

For example, the controller 22 may be selectively operable between an event-driven mode in which the controller 22 communicates the environmental condition based on the nature of the environmental condition and an operation-driven mode in which the controller 22 communicates the environmental condition during driving of the vehicle 12. The nature of the environmental condition may refer to the quality, commonality, or intensity of the weather. For example, the nature of the weather pattern can include intense weather patterns, such as funnel clouds, tornados, hailstorms, and the like, and/or ordinary weather events such as rain, cloudy skies, sunlight, warm/cold weather, etc. In some examples, the controller 22 is selectively operable into a manual mode in which the user may manually report the environmental condition.

The control circuitry may be configured to communicate a signal to present an option at a user interface 26 in the vehicle 12 to select the event-driven mode, the operation-driven mode, or the manual mode. The reporting of the environmental condition is controlled by the user via the user interface 26. The control circuitry is configured to communicate a message to indicate an incentive to activate reporting of the environmental condition when the reporting is deactivated. For example, as will be described further in relation to the proceeding figures, one or more of these modes may be incentivized via points, credit, or other incentives rewarded to a user for choosing a given reporting mode.

Still referring to FIG. 1, the weather sensors 18 can include one or more imagers 28, rain sensors 30, ambient light sensors 32, temperature sensors 34, wind speed sensors 36, wind direction sensors 38, microphones 40, or any other sensor configured to detect a condition of local weather around the vehicle 12. The weather sensors 18 may be utilized in combination with or in an alternative to other systems of the vehicle 12 used for checking the detected environmental condition, such as a global position system (GPS 42) that tracks a position of the vehicle 12, the user interface 26 (e.g., manual entry of a weather condition), feedback from vehicle control systems 44, such as a telematic control unit (TCU) that includes various motion control systems, Advanced Driver Assistance Systems (ADAS), window cleaning systems (windshield wiper controls), and/or other vehicle systems 44 (e.g., ABS, steering sensors for detecting wheel slip, etc.). For example, moisture conditions may be detected using the imager 28 or the rain sensor 30 and compared to tire slippage detected by the vehicle control systems 44. The interior conditions of the vehicle 12 may also be monitored, such as climate control settings including heating/cooling conditions of an HVAC system, lighting settings of a cabin of the vehicle 12, or other interior conditions.

The vehicle control systems 44 may also be configured with one or more of the actuators previously described. The controller 22 may be configured to communicate signals to the vehicle control systems 44 to control or adjust the actuators in response to the environmental conditions. It is also contemplated that the controller 22 may control the actuators in response to the weather information following validation of the environmental conditions. Stated differently, the controller 22 may adjust the actuators following accurate estimations of the environmental conditions. The actuators can include motors for wiper control or time control, valves dispensing cleaning fluid, steering motors, actuators, ABS control, or any other vehicle control mechanisms that can be controlled in response to different weather conditions.

The controller 22 can include one or more processors 46 and a memory 48 storing instructions for execution by the one or more processors 46. When executed by the one or more processors 46, the controller 22 may initiate steps to monitor the weather sensors 18 and control one or more of the vehicle control systems 44 in response to the weather conditions detected. For example, rain may be detected by the imager 28 and the controller 22 may communicate a signal to operate wipers of the vehicle 12. High or low temperatures detected by the temperature sensor 34 may cause the controller 22 to communicate a signal to the HVAC system to operate heating or cooling of the vehicle interior.

Communication between the weather sensors 18 and the controller 22 may be facilitated via wired or wireless communication protocols. For example, a control area network 50 (CAN) may be implemented in the 12. Various other protocols, such as Wi-Fi®, Bluetooth®, Ethernet, TCP/OP, Universal Serial Bus (USB) or any other protocols may be used. Communication amongst any of the other systems of the vehicle 12 (e.g., the HMI 26, the GPS 42, the vehicle control systems 44) may employ the same or different protocols. While the controller 22 may perform various responses to the detected weather conditions of the environmental local to the vehicle 12, in a preferred example, the controller 22 is further configured to communicate the detected weather conditions to a network 50 via the network interface 20. For example, the temperature or moisture conditions of the environment may be reported to the vehicle fleet 14 and/or one or more weather stations 51 via the network 50. The network interface 20 may be a communication module for transmitting/receiving signals, to/from the server 24 via the network 50. For example, the network interface 20 can include one or more antennas for wireless communication to a weather reporting network, such as the network 50. Wi-Fi®, SMS, and/or any wireless communication protocol may be employed by the network interface 20.

Still referring to FIG. 1, the imager 28 may include one or more cameras 52 in communication with an image processor 54 for performing various image processing functions related to environmental condition detection. For example, the one or more cameras 52 can include a backup camera, a vehicle-forward camera, side cameras, interior cameras, or a camera having any other view of the vehicle 12 or the outside of the vehicle 12. In a preferred example, the image processor 54 processes images of the outside of the vehicle 12 to detect different types of environmental conditions. For example, the image processor 54 can implement one or more neural networks 50 for tracking pixel groupings to perform object recognition or other pattern recognition. In some examples, the image processor 54 is configured to detect moisture conditions (e.g., rain, puddles, splashes), wind direction and/or speed, lighting conditions, and other environmental conditions. In one example, the image processor 54 utilizes background-oriented Schlieren (BOS) image analysis to calculate the density field of a fluid (e.g., air) between two static images. For example, a density gradient and/or orientation may be determined, thereby providing a localized wind speed estimate using image processing.

The controller 22 may further, or alternatively, read from the rain sensor 30, the ambient light sensor 32, the wind spread sensor, the wind direction sensor 38, the humidity sensors, or any other weather detection sensor to determine the environmental conditions. These weather sensors 18 may report digital or analog readings to the controller 22. The controller 22 may execute various routines to weigh the readings of the weather sensors 18, as will be described further. In general, infrared light may be detected by the ambient light sensor 32 via an IR sensor. The rain sensor 30 may include one or more capacitors for detecting rain via capacitance measurements. For example, the rain sensor may be mounted toward a windshield of the vehicle 12 for detecting moisture. The wind speed and wind directions sensors 38 may utilize diaphragms and tubing to detect the wind speed and direction.

In general, use of the weather sensors 18 described herein may be enhanced by the weather detection system 10 calibrating the readings from the weather sensors 18. For example, if the imager 28 initially flags rain conditions that are not, in fact, rain conditions by comparing to crowd-sourced data, threshold parameters may be adjusted to fine-tune the estimation provided by the image processor 54 to categorize rain conditions. Similarly, readings from other sensors (e.g., the infrared ambient light sensor 32) may be weight-adjustable by the controller 22. For example, manufacturing variability may cause some sensors to report values, and the weather detection system 10 can calibrate each weather sensor 18 to reflect weather information more accurately across various models of the weather sensor 18.

Still referring to FIG. 1, the server 24 stores the environmental condition information reported by each vehicle 12 of the vehicle fleet 14. The server 24 may also include any number of databases for storing such environmental condition information and any number of processors 46 for synthesizing the environmental condition information to calculate weather conditions within a geographical region (see FIG. 2). For example, the server 24 may process the position data of the vehicle 12 as reported by the GPS 42 along with the environmental conditions to generate a map 56 of the weather conditions of a geographic area (e.g., 1, 2, 5, 10, 30 square miles or more). Thus, at least a portion of the control circuitry may be included in the server 24 for comparing the various reported environmental conditions to one another to identify statistical or logical relationships related to weather patterns. In this way, outliers of the statistical model can be used to detect inoperability conditions of weather sensors 18. The inoperability may refer to faulty, inaccurate, imprecise, or otherwise inconsistent weather sensors 18.

For example, the control circuitry, via the server 24, may be configured to amalgamate data from the individual nodes 16a-16g (FIG. 2) of the vehicle fleet 14 and determine an estimation value for the environmental condition based on the amalgamation. The server 24 may detect a difference between the estimation value and the environmental condition. In this way, inaccurate reporting from weather sensors 18 for one or more of the vehicles 12 may be identified by the control circuitry. The server 24 may communicate a message or signal to the controller 22 of the vehicle 12 indicating that the weather data reported is, or likely is, inaccurate. The controller 22 may then determine that the weather sensor(s) 18 used to detect the environmental condition reported to the server 24 is/are inoperable, and other weather sensors 18 may be used for environmental detection and/or an indication of inoperability may be communicated to the user via the user interface 26 to indicate inoperability. For example, if the imager 28 was used to determine a rain condition, and the imager 28 is later determined to be inoperable based on comparison to the crowdsourced weather data, the controller 22 may instead sample data from the rain sensor 30 for future rain detection.

The controller 22 may be configured to communicate an indication of a software version of one or more of the weather sensors 18, or weather sensing software, to the server 24 in response to detection of the inoperable state of a given weather sensor 18, as will be described further in reference to FIG. 4. For example, the image processor 54 of the imager 28 may have a corresponding software revision level that may be updated by the server 24 to change the imager 28 to an operable state. Additionally, or alternatively, flash software may be stored on the weather sensor 18 and may have multiple versions for use. In another example, the controller 22 has one or more modules that may be updated.

The server 24 is also configured to anonymize information provided to the vehicle fleet 14. For example, while weather conditions may be estimated in a region using data from multiple vehicles, including the positions of the multiple vehicles, the positions of the multiple vehicles may be anonymous relative to other vehicles in the fleet of vehicles. Thus, the locations illustrated in FIG. 2 may not be visible to users of vehicles in the vehicle fleet 14.

Figure 2:
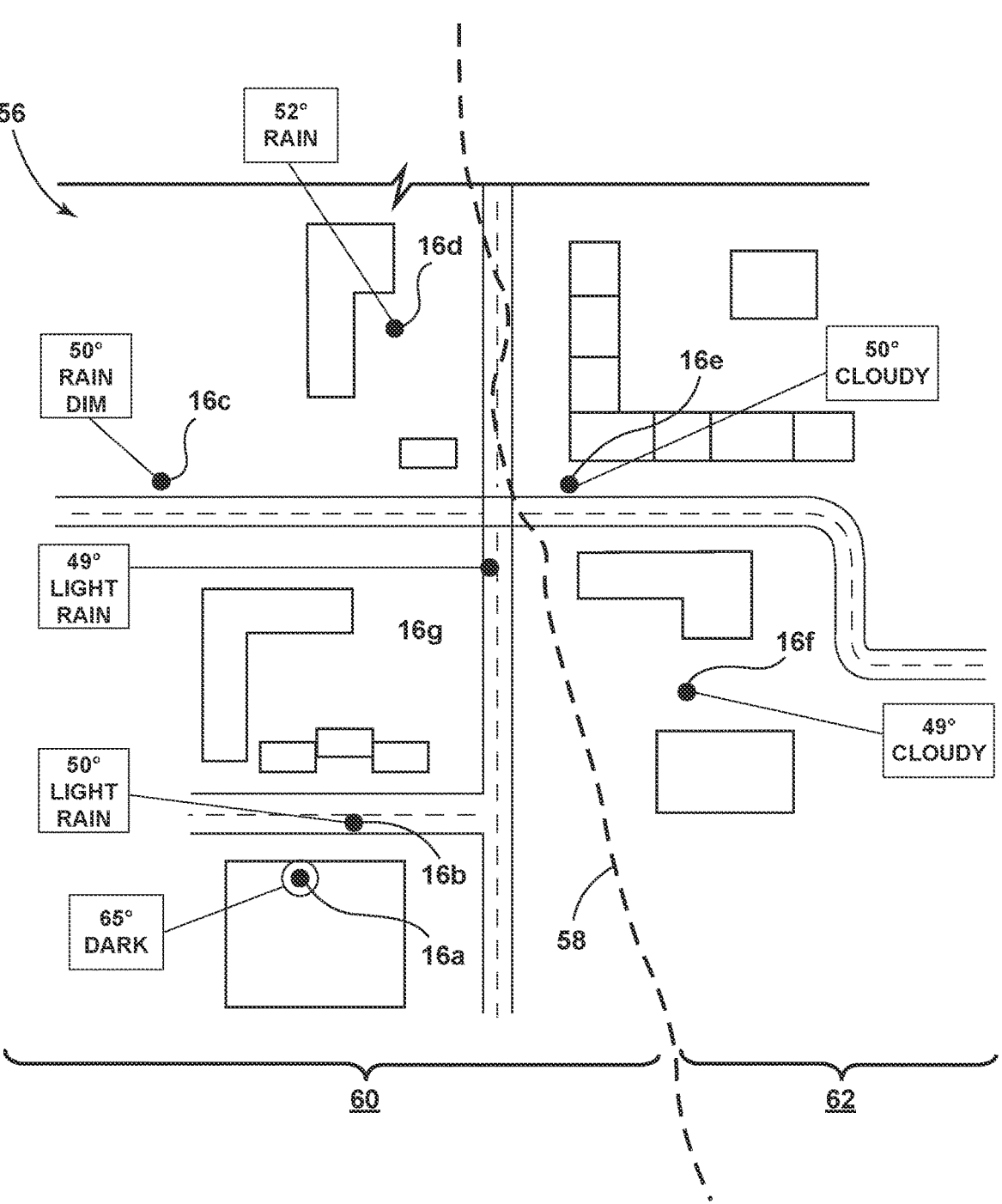
FIG. 2 is a functional plan view of a crowdsourced environment employing a weather detection system.

Referring now to FIG. 2, the weather detection system 10 may be operable to map 56 the weather conditions of a region in which a target vehicle 12, or target node 16a, is located. The nodes 16a-16g correspond to members of the vehicle fleet 14. Although illustrated overlaying the map 56, due to the anonymizing of data reporting by the server 24, such mapping 56 of the weather conditions may omit visibility of the nodes 16a-16g when presented to a user (via e.g., the user interface 26).

As demonstrated in FIG. 2, each node 16a-16g is configured to selectively report environmental conditions of the location of the corresponding node 16a-16g. Based on the reported environmental conditions, the control circuitry determines weather data of a region of the target node 16a.

For example, the server 24 may compile all of the environmental in a region to classify the weather, such as rainy, overcast, a specific temperature or temperature range, thunderstorm conditions, hurricane conditions, tornado conditions, lighting conditions, etc. While the properties reported by the nodes 16a-16g in FIG. 2 are primarily temperature and lighting/rain conditions, it is contemplated that any/all environmental conditions detected by weather sensors 18 on each node 16a-16g may be reported to the server 24 and tracked.

The target node 16a of FIG. 2 is inside a building. Accordingly, the reported environmental conditions significantly differ from the reporting in the region (higher temperature, lower light levels). Accordingly, the controller 22 may utilize the position data to selectively exclude this data without determining an inoperable condition of weather sensors 18 on the target node 16a. For example, while the reported temperature may be more than 5° F. from the actual weather conditions, the server 24 may nonetheless not report an inoperable condition due to the target node 16a being in a garage, under a carport, etc. where temperature or other environmental conditions are significantly different than the actual weather conditions. Thus, the illustrated example demonstrates accurate weather condition reporting using position data.

As demonstrated in FIG. 2, the control circuitry may classify rainy environments based on the environmental conditions reported by the vehicle fleet 14. For example, the control circuitry may generate a divider 58 between a first region 60 experiencing rainfall and a search region not experiencing rainfall. Accordingly, automatic control options for the vehicle 12, such as automatic headlight functionality, automatic wiper control, or automatic speed adjustment may be implemented proactively as the vehicle 12 approaches and crosses the divider 58 into a rainy environment. Such dividers 58 may be determined for any other weather condition. Thus, the control circuitry is configured to communicate a signal to lighting systems, wiper control systems, or vehicle motion control systems based on the crowd sourced weather reporting.

Figure 3:
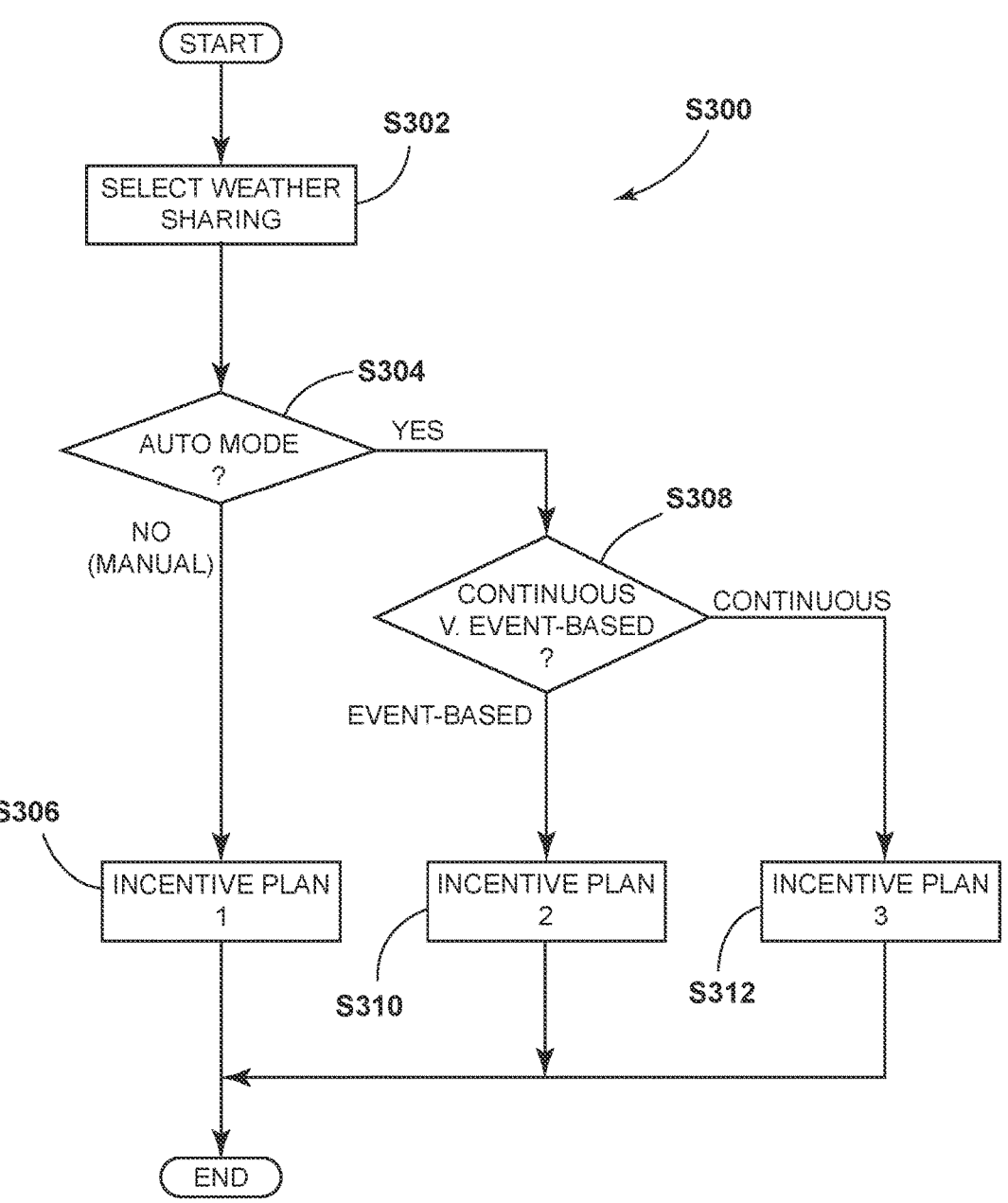
FIG. 3 is a flowchart demonstrating a method for incentivizing usage of a crowdsourcing feature of a weather detection system.

Referring now to FIG. 3, an incentive-based method S300 to promote weather reporting for the vehicle 12 may be carried out by the weather detection system 10. The incentives provided to the user may be in the form of points, fuel cards, maintenance discounts, money, or other incentives. The level of incentive distribution may vary depending on the weather reporting settings. For example, operation driven weather reporting may have greater rewards than manual weather reporting or event-driven reporting. By incentivizing users, a more robust weather information estimation may be provided by the vehicle fleet 14, thereby optimizing detection of inoperable weather sensors 18.

The method S300 includes selection of a weather sharing option at S302. The weather sharing option may be presented via the user interface 26 or a mobile device in communication with the vehicle 12 (e.g., a smartphone or tablet). Following the selection of the weather sharing option, the user may select between automatic or manual weather reporting at S304. For manual reporting, the user may be prompted to report weather on a time-basis (e.g., daily, hourly) or when each time the vehicle 12 engine is started, and incentives may be distributed according to a first incentive plan (S306). Alternatively, the manual weather reporting may cause the controller 22 to communicate a signal to generate, or make visible, a digital button on a touch-screen interface to allow the user to select when a significant or intense weather condition occurs. For example, if the imager 28 detects the formation of a funnel cloud in the sky or the microphone 40 detects hail, the user interface 26 may present a prompt to report the weather condition when in the manual reporting mode. In other examples, rain conditions or exceptional conditions outside of a typical weather pattern detected by the weather sensors 18 may cause the user interface 26 to prompt the user to report the weather condition.

If the automatic weather reporting option is selected, the method S300 further includes presenting an option to energize operation-driven weather reporting or event-driven weather reporting at S308. For example, in the operation-driven weather reporting mode, the environmental conditions detected based on the weather sensor(s) 18 are communicated to the server 24 when the vehicle 12 is in use/powered on, and incentives are distributed according to a second incentive program (S310). In the event-driven weather reporting mode, the environmental conditions are reported based on classification of the environmental conditions, and incentives are distributed according to the third incentive plan (S312). For example, the control circuitry can compare the detected environmental conditions to an array of pre-stored environmental conditions that trigger environmental condition reporting automatically. The array may be programmable by the control circuitry (e.g., a learning algorithm) or may be programmed by the user.

For example, the array may be programmed to various pre-defined classes selectable by the user. The classes may include TIER 1 weather events, TIER 2 weather events, and so on, with each tier corresponding to a set of weather conditions. For example, TIER 1 may include only urgent conditions, such as storms (tornado, hurricane, hail, thunderstorm, etc.), TIER 2 may include rain conditions, TIER 3 may include other conditions, and so on. Accordingly, the user may select automatic reporting when the environmental condition falls into one of the tiers. In this way, the automatic weather reporting may have different levels depending on user settings.

Each of the tiers may also be assigned a corresponding incentive level. For example, selecting TIER 1 described above may be rewarded with a first incentive level, and selecting TIER 2 may be rewarded with a second incentive level different than the first incentive level. The rewards for TIER 1 selection may be lower than the rewards for TIER 2 selection according to an expected frequency of automatic reporting. In this way, the incentive-based method S300 may be dynamically adjusted to promote crowdsourcing.

Figure 4:
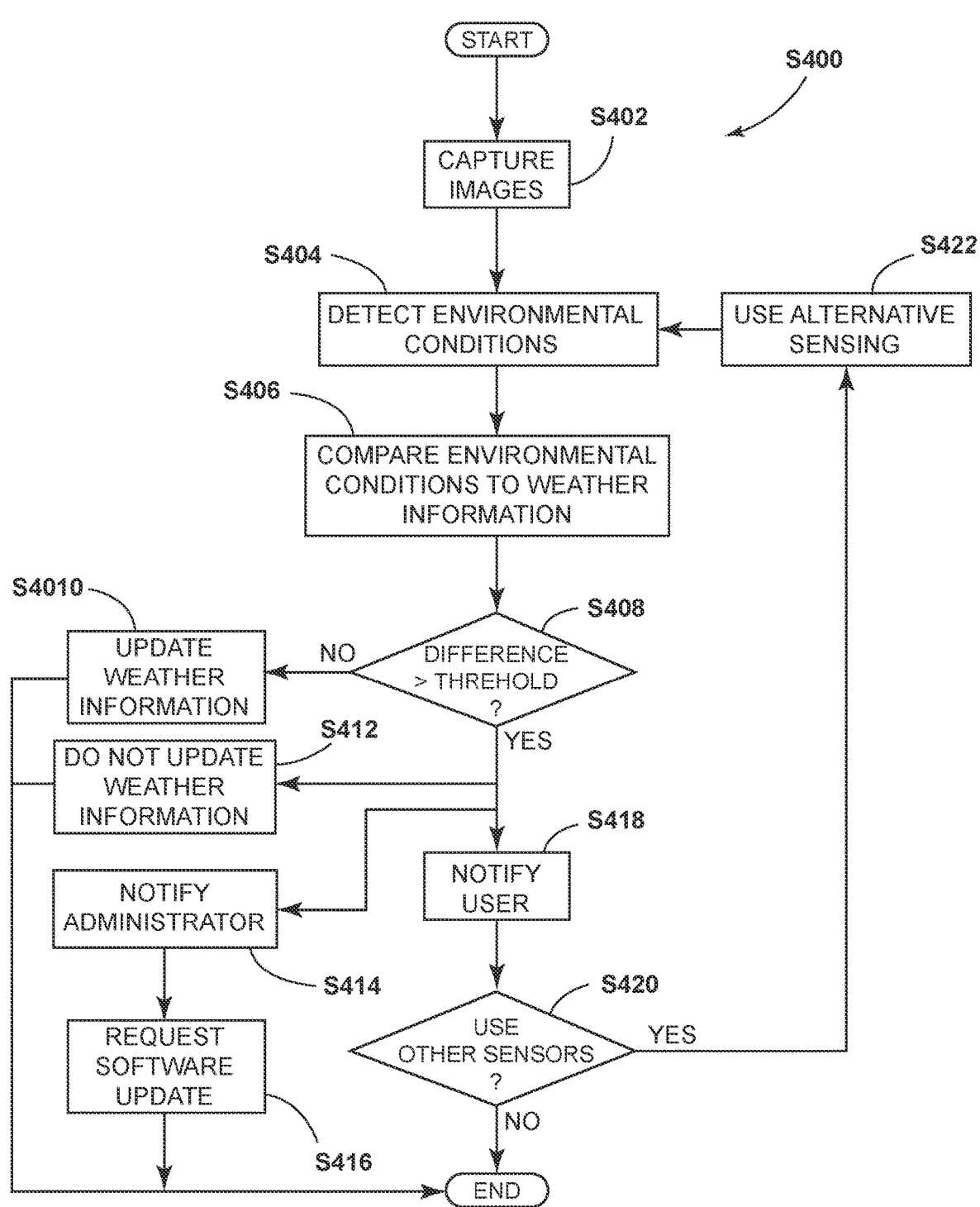
FIG. 4 is a flowchart demonstrating a method of detecting weather sensor inoperability of a weather detection system.

Referring now to FIG. 4, a method S400 for detecting operability of a weather sensor 18 in the form of the image is presented, though the method S400 may apply to the other weather sensors 18 described herein. At step S402, the imager 28 operates the camera(s) 52 to capture images of the region external to the vehicle 12. At step S404, the environmental conditions are detected based on the images. For example, the controller 22 may determine the environmental conditions. The environmental conditions may then be compared to the weather conditions at step S406. For example, the server 24 may determine the weather conditions in a region based on crowdsourced weather information from the remainder of the vehicle fleet 14 in or around the region.

At step 408, the control circuitry calculates a difference in the environmental condition and the weather information to check if the difference exceeds a predefined threshold. For example, if the given environmental condition is a temperature, the threshold may be a percent of change from the expected temperature (e.g., based on the weather information from the vehicle fleet 14). In other examples, other qualitative differences may be included, such as standard deviations, medians, modes, weighted averages (e.g., based on proximity of other nodes 16a-16g relative to the target node 16a), or other statistical operations for calculating temperature, humidity, wind speeds, wind directions, etc. In some examples, the threshold is a qualitative classification threshold. For example, if the detected environmental condition is "NIGHT" or "DARK" but the weather information indicates "SUNNY DAY," the difference may exceed a threshold, whereas "DIM" and "SUNNY DAY" may not qualify as exceeding the threshold. Thus, the threshold may be any quantitative or qualitative parameter for checking accuracy of the reported environmental condition.

If the difference is less than or equal to the threshold, the weather information is updated at step S410. For example, the controller 22 or the server 24 may store the reported environmental condition and update the weather information for the given region. Stated differently, once the control circuitry detects a good reading (e.g., an operable weather sensor 18), the control circuitry updates the estimated weather conditions of a given region and continues to accept data from the target node 16a.

If the difference exceeds the threshold, the weather information is not updated (step S412), an administrator of the control circuitry (e.g., a software distribution server 24) is notified of the current software revision of the weather sensor 18 and/or a portion of the controller 22 (step 414), and the server 24 requests a software update for the weather sensor 18/controller 22 based on the current software revision (S416). At step 418, the user interface 26 can present a notification for the user indicating that the weather sensor 18 is inoperable. At step 420, the user interface 26 prompts the user to select another weather sensor 18 to estimate the environmental condition or dismiss the inoperability detection. For example, if the image-based detection for rain was inoperable (e.g., a detection of rain when the weather information indicated clear conditions), the controller 22 may select use of the rain sensor 30 to detect rain. In another example, both the imager 28 and the rain sensor 30 were initially used, but upon inoperability, the controller 22 selects use of only the rain sensor 30. If the user selects the alternative weather sensor 18, the alternative weather sensor 18 is monitored to detect the environmental condition based on another sensing method.

It is contemplated that, while some steps of the method S400 are not shown in detail, the method S400 can further include operating one or more components in response to the weather information and/or the environmental condition. For example, in response to detection of rain, the controller 22 may communicate an instruction to the wipers to initiate a wipe cycle, reduce speed, etc. Alternatively, in response to inoperability detection of the weather sensor 18, the control circuitry may not trust the reading from the weather sensor 18 and thus withhold communication of an instruction to one or more of the vehicle control system 44 to energize or activate an actuator (e.g., wipers, steering, etc.). Thus, in addition to operability detection for the weather sensor(s) 18 and incentivizing crowdsourcing, the present weather detection system 10 further provides for enhanced vehicle-responses to weather conditions.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A weather detection system for a vehicle, comprising:
   a weather sensor configured to sense an environmental condition of a region external to the vehicle;
   an actuator for controlling a response to the environmental condition;
   a network interface configured to access weather data from a vehicle fleet;
   a user interface in the vehicle; and
   control circuitry in communication with the weather sensor and the actuator and including a controller, wherein the control circuitry is configured to:
      access the weather data via the network interface;
      compare the weather data to the environmental condition;
      detect an inoperable state of the weather sensor based on the comparison;
      control the actuator based on detection of the inoperable state; and
      selectively report the environmental condition for communication to the vehicle fleet according to an input to the user interface,
   wherein the controller is selectively operable, via the user interface, between an event-driven mode, in which the controller communicates the environmental condition based on an identity of the environmental condition, and an operation-driven mode, in which the controller communicates the environmental condition during driving of the vehicle.

2. The weather detection system of claim 1, further comprising:
   a GPS that tracks a position of the vehicle; and
   a server that processes the position of the vehicle and the environmental condition to anonymize information provided to the vehicle fleet.

3. The weather detection system of claim 2, wherein accessing weather data includes the control circuitry amalgamating data from individual nodes of the vehicle fleet and determining an estimation value for the environmental condition based on the amalgamation.

4. The weather detection system of claim 3, wherein comparing the weather data to the environmental condition includes detecting a difference between the estimation value determined by the control circuity and the environmental condition sensed by the weather sensor.

5. The weather detection system of claim 2, wherein the weather sensor includes a camera that captures images of the environment external and an image processor that processes the image to detect the environmental condition.

6. The weather detection system of claim 5, wherein the controller is local to the vehicle and is configured to communicate an indication of the inoperable state and a software version of the image processor to the server in response to detection of the inoperable state.

7. The weather detection system of claim 6, wherein the server is configured to communicate an update for the image processor based on the software version.

8. The weather detection system of claim 7, wherein the control circuitry is further configured to communicate a message to indicate an incentive to activate reporting of the environmental condition when the reporting is deactivated.

9. A weather detection system for a vehicle, comprising:
   a weather sensor configured to sense an environmental condition of a region external to the vehicle;
   an actuator for controlling a response to the environmental condition;
   a network interface configured to access weather data from a vehicle fleet;

a user interface in the vehicle;

a controller local to the vehicle in communication with the weather sensor and the actuator, wherein the controller is configured to control the actuator based on detection of an inoperable state of the weather sensor; and a server in communication with the controller configured to compare the weather data to the environmental condition and detect the inoperable state of the weather sensor based on the comparison, wherein the controller is selectively operable, via the user interface, between an event-driven mode, in which the controller reports the environmental condition to the vehicle fleet based on an identity of the environmental condition, and an operation-driven mode, in which the controller reports the environmental condition to the vehicle fleet during driving of the vehicle.

10. The weather detection system of claim 9, wherein the controller is further configured to communicate a message to indicate an incentive to activate reporting of the environmental condition when the reporting is deactivated.

11. A weather detection system for a vehicle, comprising:

a weather sensor configured to sense an environmental condition of a region external to the vehicle;

an actuator for controlling a response to the environmental condition;

a network interface configured to access weather data from a vehicle fleet;

a GPS that tracks a position of the vehicle;

a server that processes the position of the vehicle and the environmental condition to anonymize information from the vehicle provided to the vehicle fleet;

a user interface in the vehicle; and control circuitry in communication with the weather sensor and the actuator and including a controller local to the vehicle, wherein the control circuitry is configured to:

access the weather data via the network interface;

compare the weather data to the environmental condition;

detect an inoperable state of the weather sensor based on the comparison;

control the actuator based on detection of the inoperable state; and selectively report the environmental condition to the vehicle fleet according to an input to the user interface, wherein the controller is selectively operable, via the user interface, between an event-driven mode, in which the controller communicates the environmental condition based on an identity of the environmental condition, and an operation-driven mode, in which the controller communicates the environmental condition during driving of the vehicle.

12. The weather detection system of claim 8, wherein the control circuitry is further configured to selectively report the environmental condition based on a selectable class of weather events.

13. The weather detection system of claim 12, wherein the message comprises an incentive level corresponding to the selectable class of weather events.

14. The weather detection system of claim 10, wherein the controller is further configured to selectively report the environmental condition based on a selectable class of weather events.

15. The weather detection system of claim 14, wherein the message comprises an incentive level corresponding to the selectable class of weather events.

16. The weather detection system of claim 15, wherein the controller is further configured to automatically report the environmental condition based on the selectable class of weather events, and wherein the selectable class of weather events is one of a plurality of selectable classes.

17. The weather detection system of claim 11, wherein the control circuitry is further configured to communicate a message to indicate an incentive to activate reporting of the environmental condition when the reporting is deactivated.

18. The weather detection system of claim 17, wherein the control circuitry is further configured to selectively report the environmental condition based on a selectable class of weather events.

19. The weather detection system of claim 18, wherein the message comprises an incentive level corresponding to the selectable class of weather events.

20. The weather detection system of claim 19, wherein the control circuitry is further configured to automatically report the environmental condition based on the selectable class of weather events, and wherein the selectable class of weather events is one of a plurality of selectable classes.

* * * * *